United States Patent
Le et al.

(10) Patent No.: US 10,343,791 B2
(45) Date of Patent: Jul. 9, 2019

(54) INTEGRATED CURRENT RETURN NETWORK IN COMPOSITE STRUCTURES

(71) Applicant: The Boeing Company, Chicago, IL (US)

(72) Inventors: Quynhgiao Le, Bellevue, WA (US); Robert B. Greegor, Black Diamond, WA (US); Brent A. Whiting, Lake Stevens, WA (US); Carol E. Anway, North Bend, WA (US); Kim M. Larson, Olalla, WA (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 15/238,597

(22) Filed: Aug. 16, 2016

(65) Prior Publication Data

US 2018/0050817 A1    Feb. 22, 2018

(51) Int. Cl.
*H02G 13/00* (2006.01)
*B64D 45/02* (2006.01)
*C23C 4/12* (2016.01)
*H05F 3/00* (2006.01)
*H05F 3/02* (2006.01)

(52) U.S. Cl.
CPC .............. *B64D 45/02* (2013.01); *C23C 4/12* (2013.01); *H02G 13/00* (2013.01); *H02G 13/80* (2013.01); *B32B 2605/18* (2013.01); *H05F 3/00* (2013.01); *H05F 3/02* (2013.01)

(58) Field of Classification Search
USPC ....................................... 361/212, 218, 220
See application file for complete search history.

(56) References Cited

U.S. PATENT DOCUMENTS

| | | |
|---|---|---|
| 4,755,904 A | 7/1988 | Brick |
| 7,525,785 B2 | 4/2009 | Rawlings |
| 7,883,050 B2 | 2/2011 | Dufresne et al. |
| 8,031,458 B2 | 10/2011 | Braden et al. |
| 9,130,325 B2 | 9/2015 | Gallant |
| 2006/0051592 A1 | 3/2006 | Rawlings et al. |
| 2006/0146473 A1* | 7/2006 | Heidlebaugh .......... H02G 13/00 361/220 |
| 2007/0230085 A1 | 10/2007 | Le |
| 2009/0004480 A1 | 1/2009 | Dufresne et al. |
| 2009/0092844 A1 | 4/2009 | Ware et al. |
| 2010/0108342 A1 | 5/2010 | Shimp |
| 2010/0320320 A1 | 12/2010 | Kismarton |
| 2013/0087380 A1 | 4/2013 | Dilligan |

(Continued)

OTHER PUBLICATIONS

Morgan, JD.; Greegor, RB.; Ackerman,P.K.; Le, Q.N.; Thermal Simulation and testing of Expanded Metal Foils Used for Lightning Protection of Composite Aircraft Structures, SAE International, 2013-1-2132, Jul. 8, 2013.

(Continued)

*Primary Examiner* — Danny Nguyen
(74) *Attorney, Agent, or Firm* — Felix L. Fischer

(57) ABSTRACT

An aircraft component incorporated in a current return network (CRN) employs a composite structural element having a web. At least one flange is connected to the web. At least one metallic conductive layer is integrated with and extends the length of the web. The at least one metallic layer is configured to electrically bond to an aircraft system and provide a ground path.

20 Claims, 14 Drawing Sheets

(56) References Cited

U.S. PATENT DOCUMENTS

2013/0271891 A1  10/2013  Shimp et al.
2014/0293497 A1* 10/2014  Foltz .................... H05F 3/00
                                                361/218
2014/0345199 A1* 11/2014  Yahata .................. B64C 1/14
                                                49/475.1
2015/0090836 A1   4/2015  Burgess et al.

OTHER PUBLICATIONS

Greegor R.B.; Morgan, J.D.; Le, Q.N.; Ackerman, P.K.; Finite Element Thermal Modeling and Testing of Expanded Metal Foils Used for Lightning Protection of Composite Aircraft Structures, 6 ICOLSE13, Jul. 11, 2013.

* cited by examiner

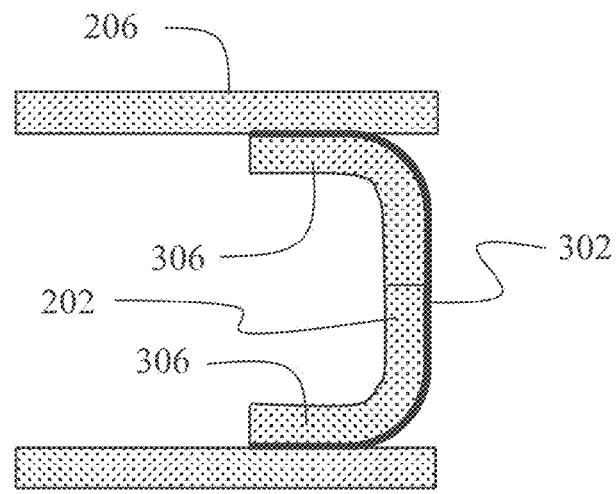
FIG. 3
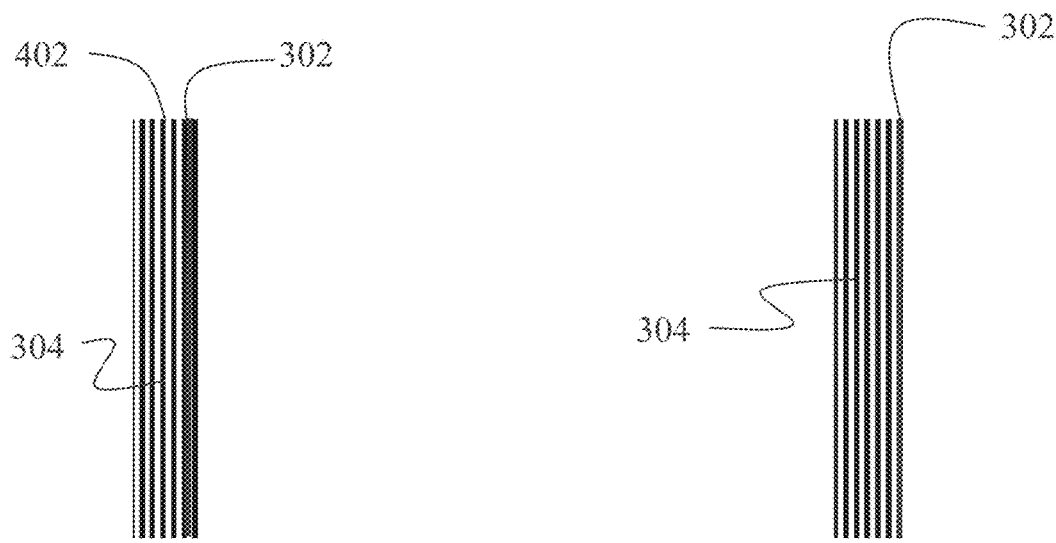
FIG. 4A
FIG. 4B

INTEGRATED CURRENT RETURN NETWORK IN COMPOSITE STRUCTURES

BACKGROUND INFORMATION

Field

Embodiments of the disclosure relate generally to current return networks for aircraft lightning and system fault current protection and more particularly to a current return system employing integrated conductive elements in carbon fiber rein forced plastic (CFRP) structural elements.

Background

Large aircraft employ numerous electrical system dispersed throughout the structure. Additionally, aircraft may be subjected to lightning strikes during flight. A current return network (CRN) within the aircraft is required to appropriately direct system fault currents from dispersed electrical systems or currents induced due to lightning strikes. Prior art aircraft with metallic structures provided readily available conductive elements in the structure itself for such current return requirements. Modern aircraft construction with primarily composite materials including the major structural elements of the aircraft require alternative current return systems since the composites typically do not have suitable conductivity. Prior art CRN systems for composite structures, such as U.S. Pat. No. 8,031,458 B2 entitled Current return network published on Oct. 4, 2011, employ dedicated conductive cables routed through the composite structure. These dedicated CRN components may add 750 lbs or more in structural weight to an aircraft with 150 lbs or more in the wing alone. Lightning protection systems (LPS) for aircraft with composite structure have been developed with conductive foils integrated into composite skins or conductive appliques engaged on the skins. However, such LPS still require connection to a CRN for proper grounding and current handling capability.

SUMMARY

Exemplary embodiments provide an aircraft component incorporated in a current return network (CRN) employing a composite structural element having a web. At least one flange is connected to the web. At least one metallic conductive layer or metallic section of the wing skin is integrated with and extends the length of the web. At least one metallic layer or metallic section of the wing skin is configured to electrically bond to an aircraft system and provide a ground path.

The embodiments disclosed provide a method for implementing a current return network wherein a desired current return path is established. A structural member providing routing approximating the current return path is fabricated with at least one integrated conductive layer. The integrated conductive layer is modified with pad ups for current localization at connection points and the integrated conductive layer is electrically connected to CRN components.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

FIG. 3 is a cross section view of an exemplary structural member employing an integrated conductive element for a CRN according to the embodiments disclosed herein;

FIG. 4A is a cross section view of a web of the structural member of FIG. 3 with an internal conductive layer in the composite as the integrated conductive element;

FIG. 4B is a cross section view of a web of the structural member of FIG. 3 with a surface conductive layer on the composite as the integrated conductive element;

DETAILED DESCRIPTION

The embodiments described herein provide a CRN network wherein dedicated cables are replaced with electrical conductors integrated into and/or onto the CFRP layups. Specifically, for composite wings, spars and horizontal stabilizers as structural components connecting the tips to side of the fuselage, the integrated CRN network employs integrated conductors designed to provide the required cross-sectional area to meet the current carrying requirements for current returns including effects from localized heating and current build up. The integrated conductors may be achieved by multiple technologies including those that may be included during the CFRP layup process such as conductor on flex, expanded wire mesh or pre-impregnated resin (pre-preg) layups with conductive fillers. Direct write technologies that may be applied onto cured composite parts such as additive manufacturing with conductive ink, thermal spray and coating with conductive fillers. The conductor area will be dependent on the conductive technologies selected and their associated electrical conductivities. In an exemplary embodiment, with copper as the conductor system, replacement of a round 00 cable is accomplished with a flat conductor having 0.005 inch thickness and 20.9 inch width for comparable cross sectional area (if only one layer of conductor is available) in order to carry an equivalent current. However, the flat conductor results in 40% lower inductance and self-induced voltage. These equivalent conductor dimensions are well within the physical boundary conditions for composite wing spars and may be accomplished using one or more of the above cited technologies. In localized areas where interconnections are needed to connect to equipment and systems, additional metal (higher metal thickness) may be provided to accommodate the expected higher heat and current levels.

Figure 1:
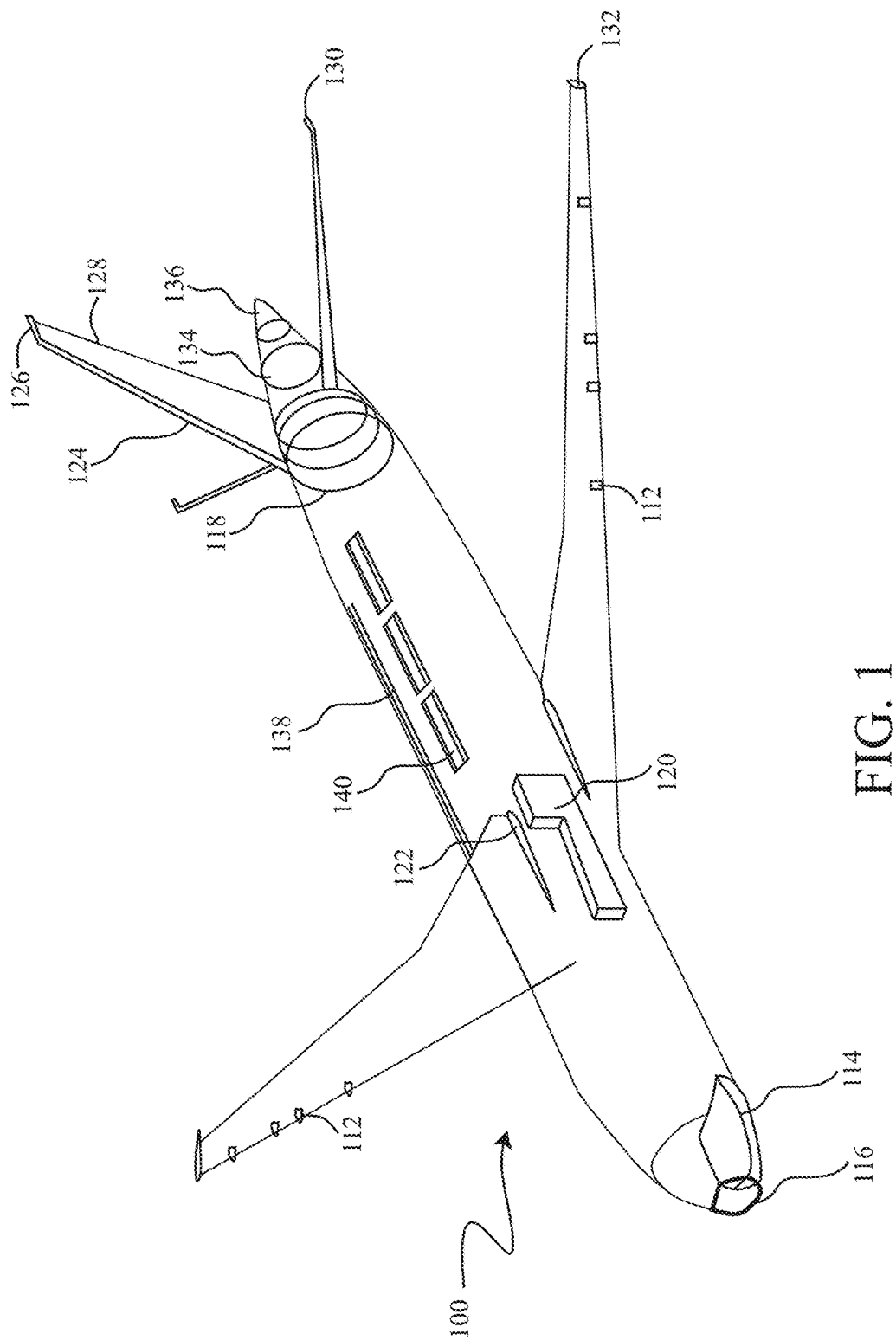
FIG. 1 is a phantom view showing CRN elements in an aircraft in which the disclosed embodiments may be employed.

Referring to the drawings, FIG. 1 shows an exemplary aircraft 100 with a substantially composite structure but employing metallic elements, principally aluminum, in certain components. The wing rib caps 112, cab floor 114, forward pressure bulkhead 116, aft section frames 118, keel beam 120, overwing floor beams 122, vertical fin auxiliary spar 124, vertical fin closeout rib 126, vertical fin trailing edge structure 128, horizontal stabilizer auxiliary spar 130, wingtip rib structures 132, APU firewall 134 and muffler 136 are example metallic elements which may be employed in the CRN structure. Additionally, various systems elements distributed within the aircraft including wiring/equipment support cradles 138, crown current return paths 140 and bilge current return paths 142 may be included in the CRN.

Figure 2A:
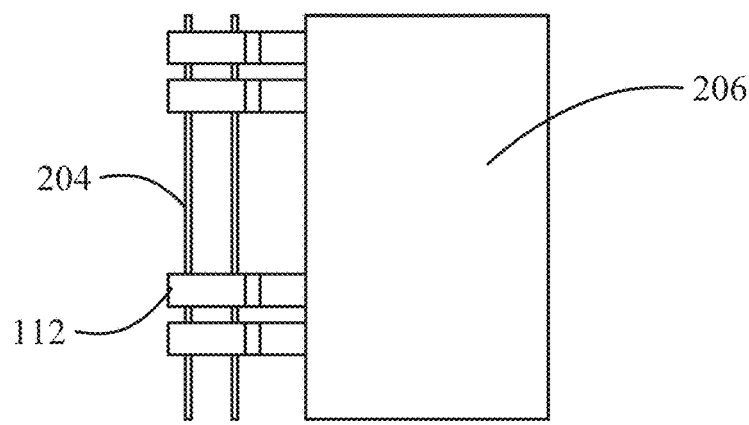
FIGS. 2A-2C are views of a prior art CRN system employing dedicated round conductors in a wing spar nose cap
Figure 2B:
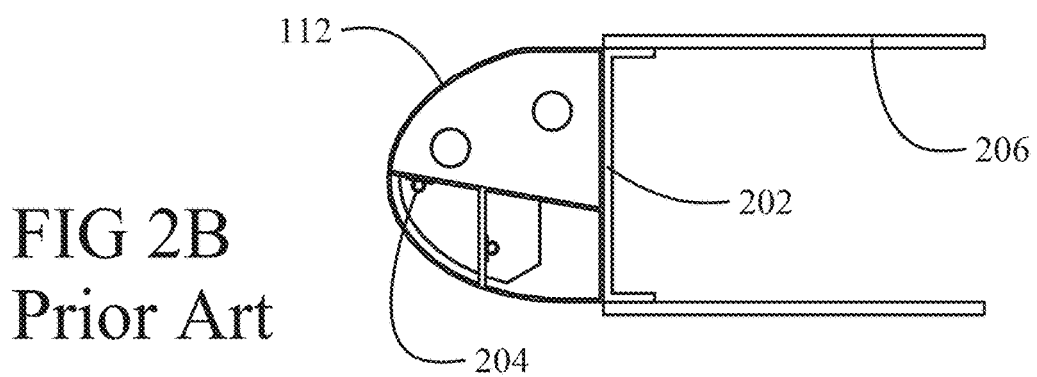
Figure 2C:
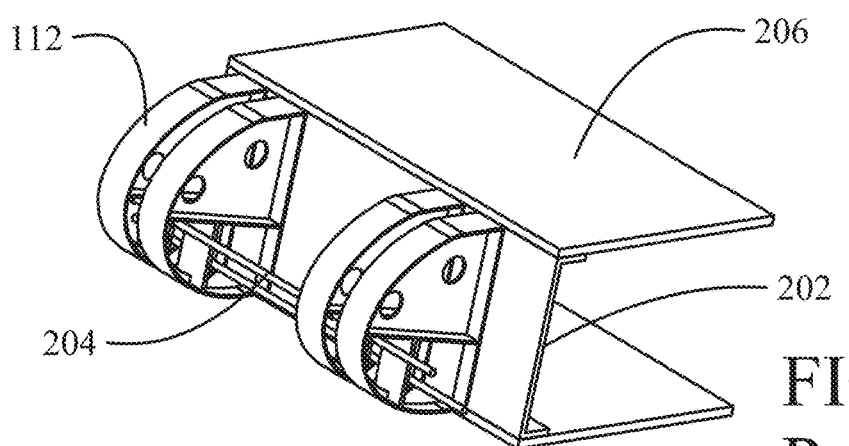

As shown in FIGS. 2A-2C, the CRN elements, such as the wing rib caps 112 which attach to a composite spar 202, typically of CFRP construction, were interconnected in the prior art with dedicated CRN cables 204 routed through the structure. Composite skins 206, again typically CFRP construction, attach to the spar 202.

Figure 5A:
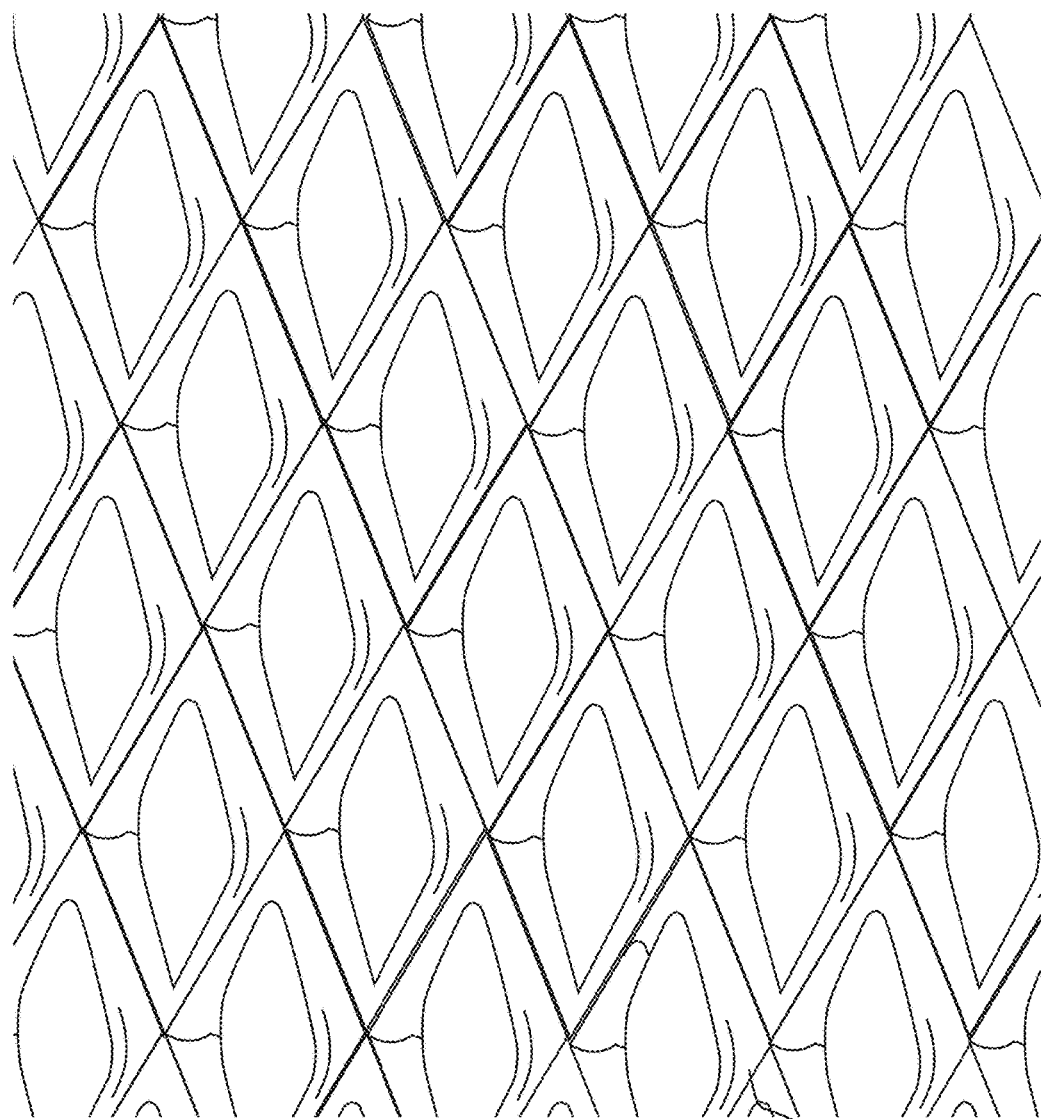
FIG. 5A displays an exemplary expanded metal foil (EMF) employed as the integrated conductive layer in exemplary embodiments.
Figure 5B:
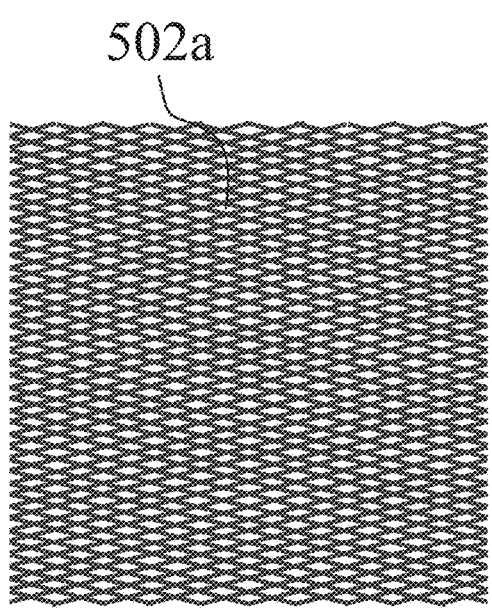
FIGS. 5B-5E show varying mesh configurations for EMF to improve coefficient of thermal expansion matching with co-cured CFRP composite laminates.
Figure 5C:
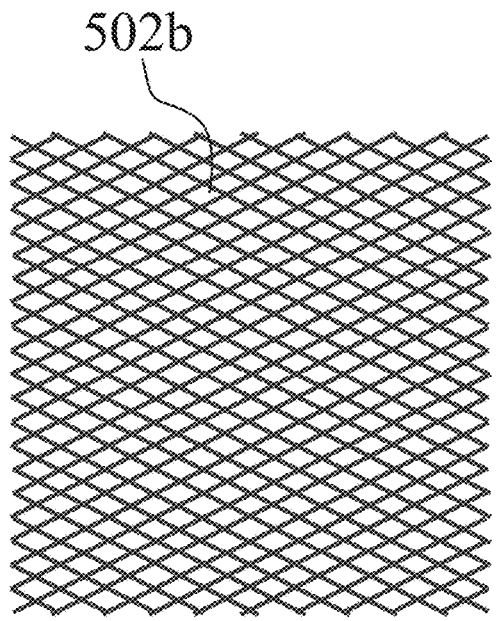
Figure 5D:
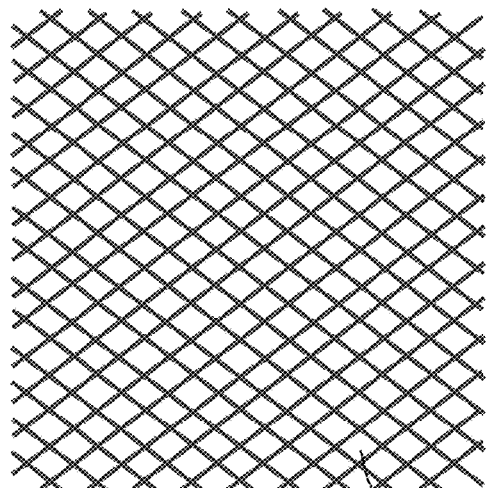
Figure 5E:
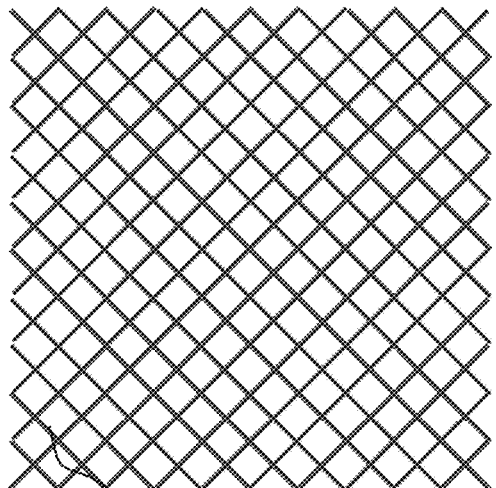

The present embodiments employ a conductive layer 302 integrated with the CFRP spar 202 or other structural element as demonstrated in FIG. 3. The CFRP spar may be a main wing spar, a horizontal or vertical stabilizer spar or other long run structural element in the aircraft in which the replacement of dedicated CRN cables is desirable. The conductive layer 302 is incorporated in or on the web 304 and/or caps 306 and may run the entire length of the spar 302 providing an integrated conductive path for the CRN. As seen in FIG. 4A, the conductive layer 302 may be integrated in the layup of the CFRP layers 402 in the web 304 as an embedded conductor and co-cured. Exemplary conductors for this application are expanded metal foil (EMF) and conductor on flex (CoF). An example EMF 502 which may be employed is represented in FIG. 5A.

Figure 6:
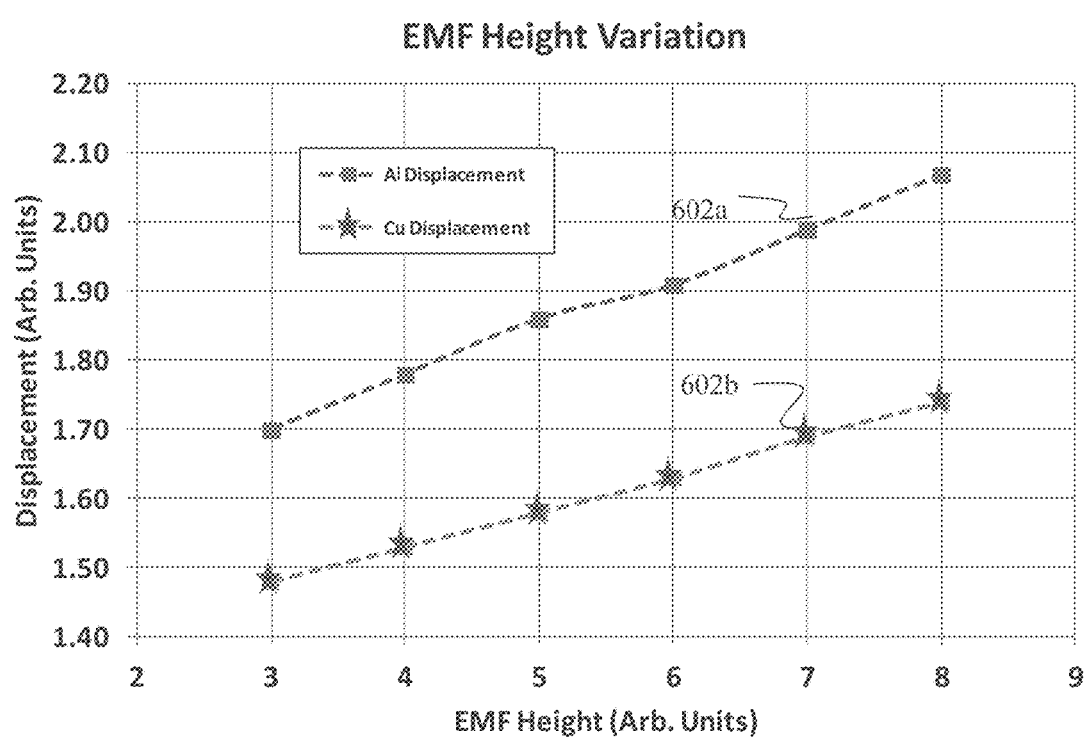
FIG. 6 is a graph showing non-dimensionalized EMF height and resulting displacement.

To enhance the EMF as a layer in the composite structure, matching of coefficient of expansion of the EMF to the CFRP layers and matrix is employed to reduce potential cracking or disbonding within the composite layup. The EMF aspect ratio (given by SWD/LWD where SWD is the short way of the diamond and LWD is the long way of the diamond) as shown for exemplary configurations in FIGS. 5B-5E for SWD/LWD of 0.25, EMF 502a; 0.5, EMF 502b; 0.75, EMF 502c and 1.0, EMF 502d, all for a 1" square of EMF with SWD varying at 0.025", 0.050", 0.075" and 0.100" with LWD maintained at 0.100" (as disclosed in Morgan, J. D. et al., "Thermal Simulation and Testing of Expanded Metal Foils Used for Lightning Protection of Composite Aircraft Structures," SAE Int. J. Aerosp. 6(2): 371-377, 2013, doi:10.4271/2013-01-2132). Better cracking performance is obtained with high SWD/LWD ratios of the EMF and increasing the width of the foil as opposed to height as shown in traces 602a for aluminum and 602b for copper in FIG. 6 for displacement dependence on height (as disclosed in Greegor, R. B. et al., Finite Element Modeling and Testing of Expanded Metal Foils Used for Lightning Protection of Composite Aircraft Structures, Proceedings of 2013 ICOLSE Conference; Seattle, Wash., Sep. 18-20, 2013). It may be noted that increased displacement (due to typical ground to air changes in temperature) correlates with increased likelihood of cracking in surface CFRP layers.

As an alternative to reduce CTE mismatch effects, resin properties of the CFRP can be altered to lessen CTE stress buildup between the EMF and CFRP. As an additional alternative, stress build up may be minimized by adding nano-silica to the epoxy interface between the EMF and the CFRP laminates. Silica/epoxy composites comparable to those used in microelectronics to release the thermal mechanical stress of solder joints between silicon chips and organic substrates because of CTE matches with solder joints (~20 ppm/K) may be employed in the present embodiments. The CTE of epoxy resin is typically 55-75 ppm/K, while fused silica has a significantly lower CTE of 0.5 ppm/K. By changing the concentration, size and surface chemistry of silica, the CTE of the silica/epoxy composites can be reduced to below 30 ppm/K. The size and distribution of silica can be well-controlled during its synthesis by adjusting the concentration of the alkoxy silane, water, and catalyst as well as the reaction temperature.

Figure 7:
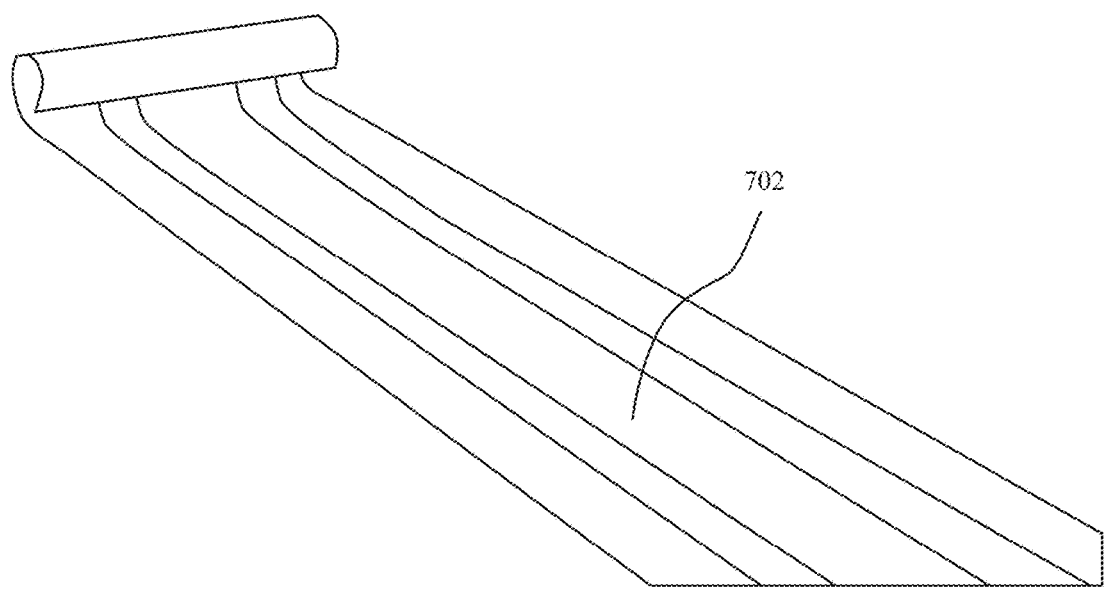
FIG. 7 displays an exemplary conductor on flex employed as the integrated conductive layer in exemplary embodiments.

An alternative integrated conductive layer 302 co-cured in the layup of the web 304 as seen in FIG. 4A is a CoF 702 demonstrated in FIG. 7. Exemplary CoF embodiments which may be employed are disclosed in U.S. Pat. No. 7,883,050 entitled COMPOSITES WITH INTEGRATED MULTI-FUNCTIONAL CIRCUITS issued on Feb. 8, 2011, having a common assignee with the present application, the disclosure of which is incorporated herein by reference.

Figure 8:
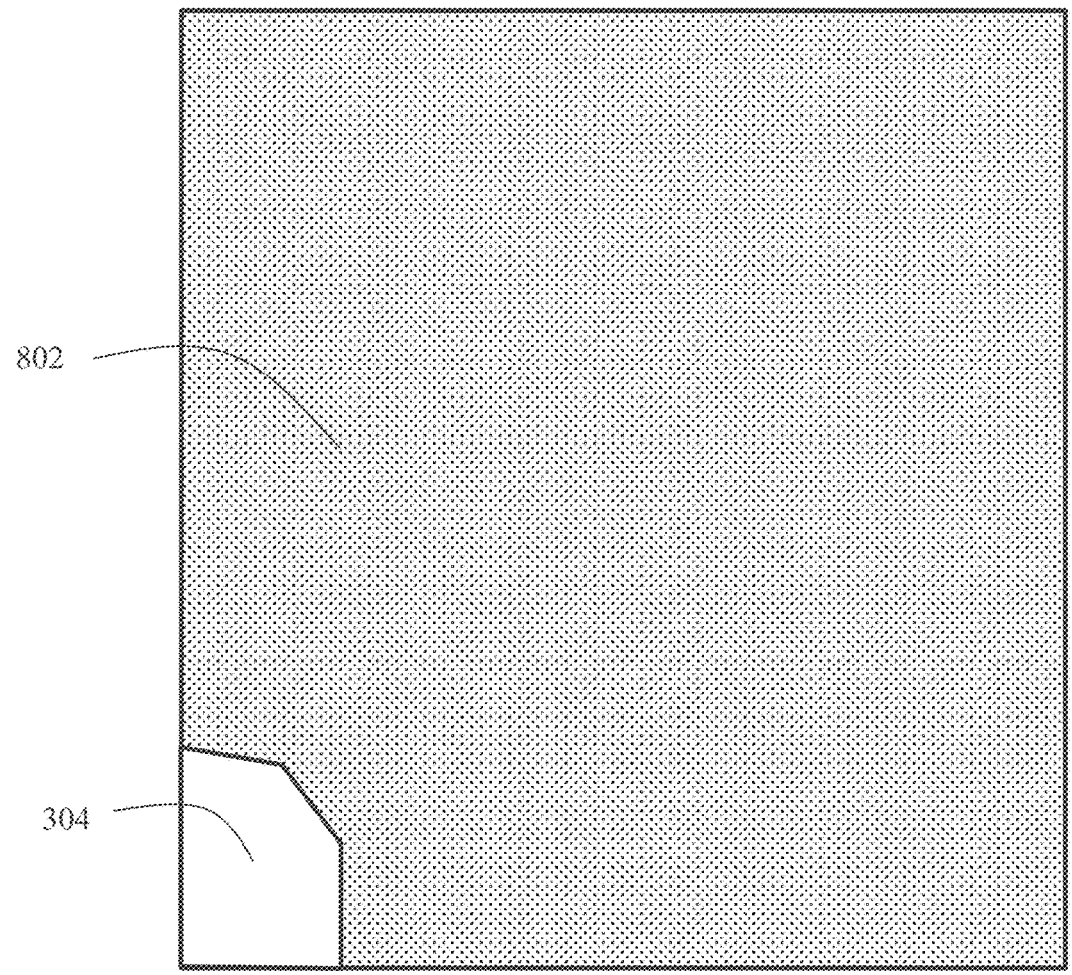
FIG. 8 displays an exemplary patterned thermal spray employed as the integrated conductive layer in exemplary embodiments.
Figure 9:
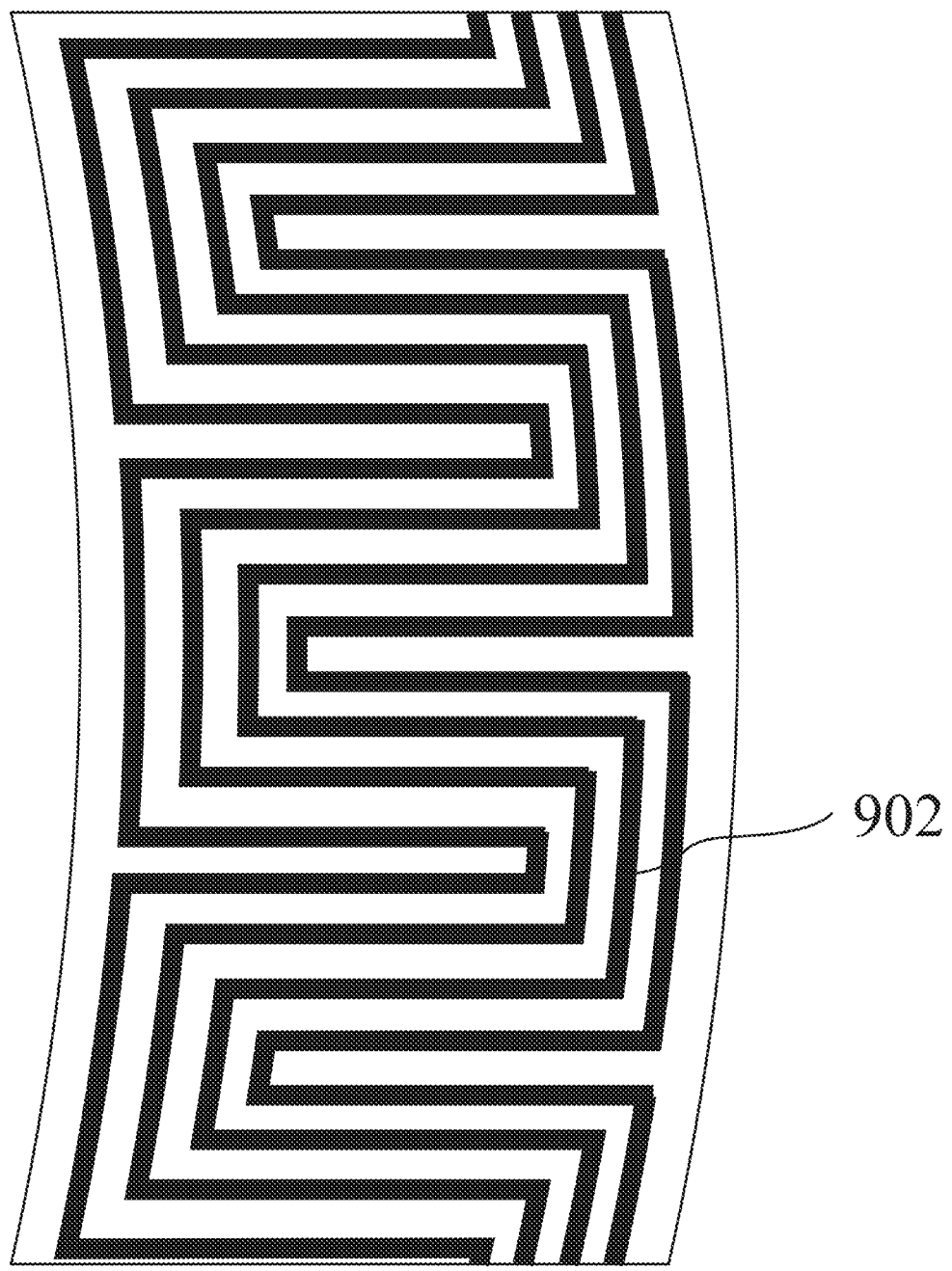
FIG. 9 displays an exemplary direct metal print employed as the integrated conductive layer in exemplary embodiments.
Figure 10:
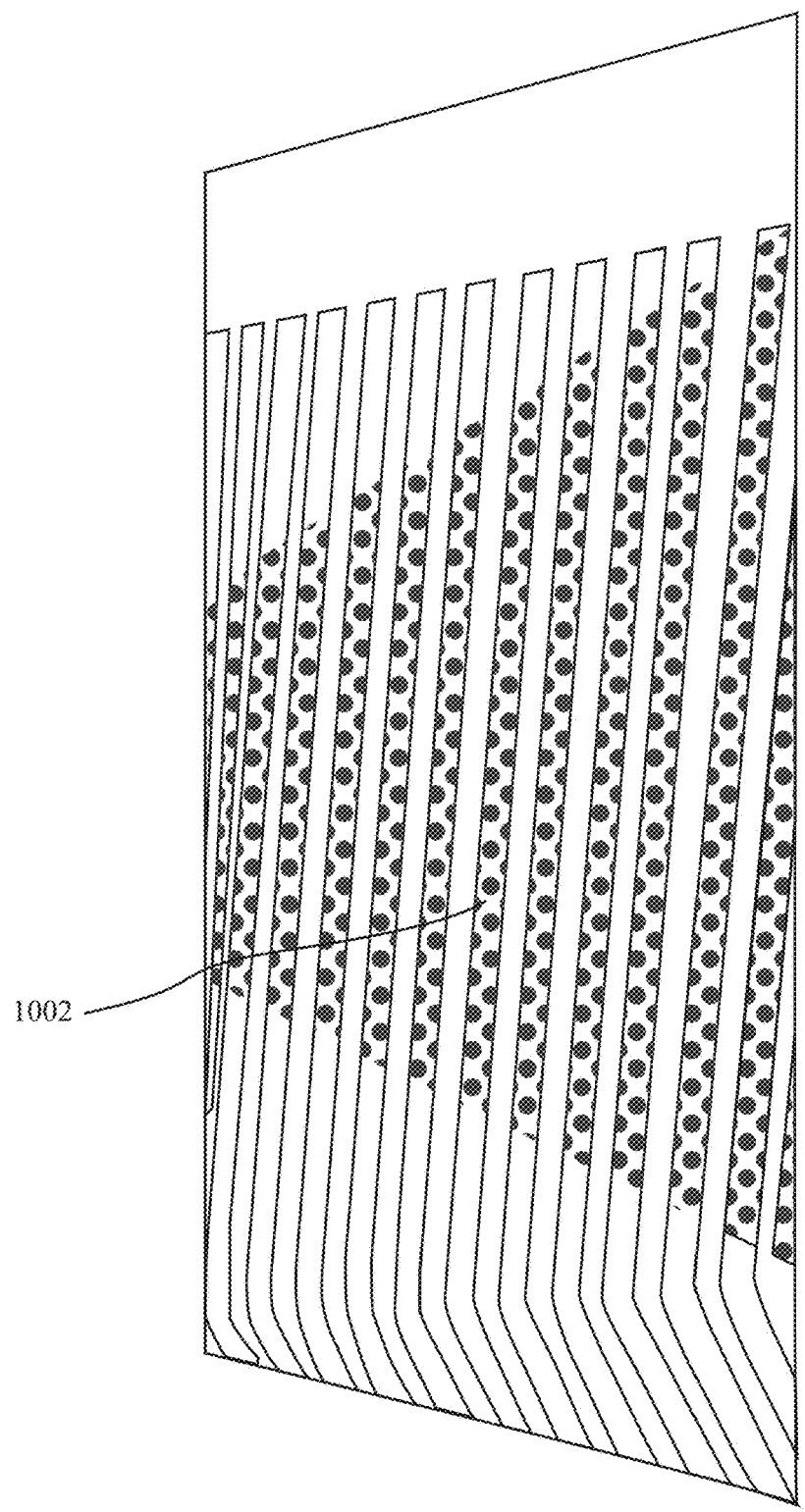
FIG. 10 displays an exemplary printed conductive ink employed as the integrated conductive layer in exemplary embodiments.

Returning to FIG. 4B, the integrated conductive layer 302 may be added to the CFRP web 304 as a surface conductor. The EMF or CoF conductive layers previously described may be applied to the CFRP web 304 bonded with high temperature adhesive to withstand heating caused by a short circuit or lightning. Commercially available adhesive films for use with CFRP cured at 350 F include Cytec Surface Master 905M, Cytec Metlbond 1515-3M, Henkel EA9845, and 3M AF555. Other exemplary surface conductors which are employed in alternative embodiments are conductive thermal spray, direct write metal printing and conductive ink printing. A thermal spray represented as spray layer 802 in FIG. 8 may be applied as disclosed in US patent publication 2009/0092844 published on Apr. 9, 2009, having a common assignee with the present application, the disclosure of which is incorporated herein by reference. Direct write metal printing results in a direct write metal surface conductor 902 represented in FIG. 9 and may employ processes such as direct write thermal spray from MesoScribe Technologies. Conductive ink printing such as silver and copper based ink systems available from Novacentrix and Mitsubishi Imaging, may be employed to provide a printed ink conductive pattern 1002 as represented in FIG. 10.

Figure 11:
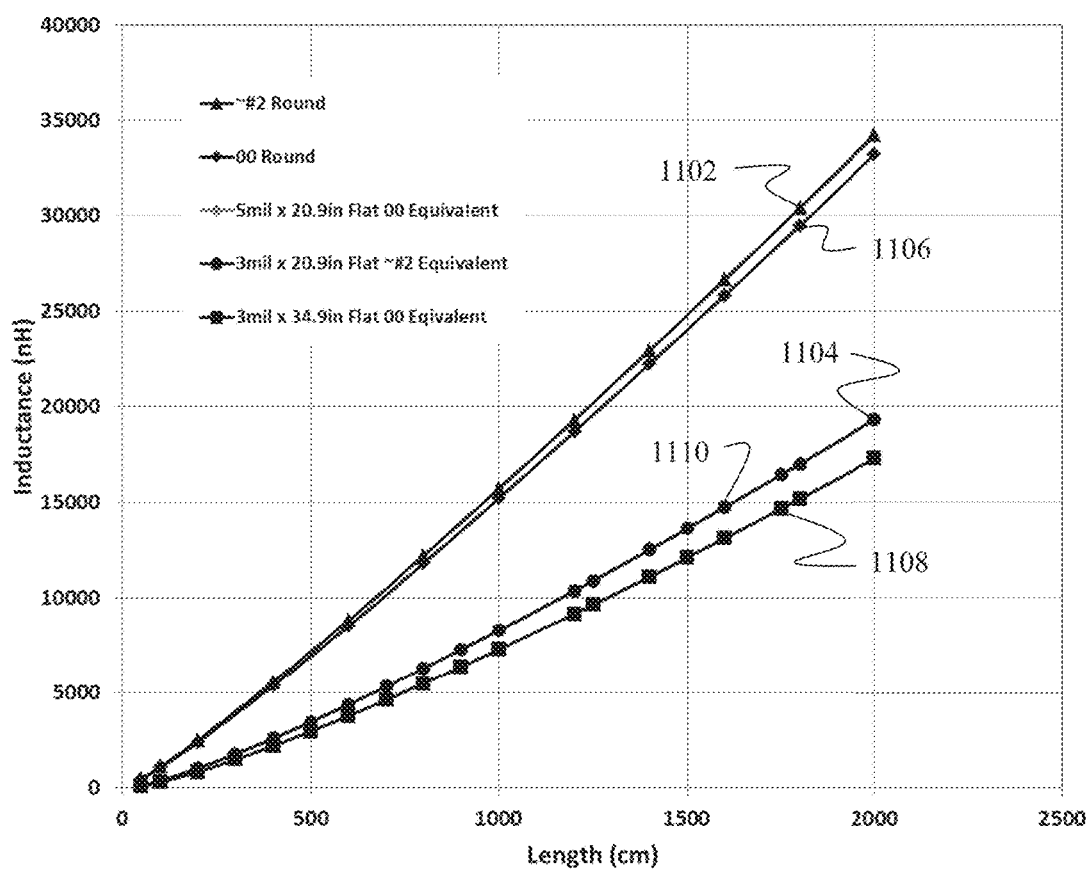
FIG. 11 is a graph demonstrating improved inductance over length for a flat integrated conductive layer compared to a round prior art conductor.

Implementation of the CRN by way of integrated conductive layers in or on a CFRP structural element itself has the additional significant benefit of relying on the differing geometric arrangement of the conductive layer, a very thin but deep (high aspect ratio) substantially rectangular cross section, over the prior art implementations of round cabling as the conductor. As seen in FIG. 11, trace 1102 shows the increase in inductance over length for a #2 round conductor (cross-sectional area 0.0521 in$^2$) with an inductance of almost 35000 nH at a length of 2000 cm, which is approximately the length of a commercial aircraft wing. A conductive layer of 3 mil×20.9 in providing an equivalent area of 0.0521 in$^2$ at an aspect ratio of 6967 as employed in the described embodiments shown in trace 1104 has a significantly reduced inductance at a length of 2000 cm of less than 20000 n HI. Similarly, trace 1106 shows the increase in inductance over length for a 00 round conductor (cross-sectional area 0.1045 in$^2$) with an inductance of about 32500 nH at a length of 2000 cm. A conductive layer of 3 mil×34.9 in providing an equivalent area of 0.1045 in$^2$ at an aspect ratio of 11633 as employed in the described embodiments shown in trace 1108 also has a significantly reduced inductance at a length of 2000 cm of 17500 nH. An alternative configuration for an equivalent to a 00 conductor of a conductive layer of 5 mil×20.9 to provide the equivalent area of 0.1045 in$^2$ at an aspect ratio 4180 of shown in trace 1110 has a significantly reduced inductance at a length of 2000 cm comparable to the #2 replacement at 19500 nH. The significant improvements in both inductance and self-induced voltage may be anticipated with aspect ratios of between 4000 and 12000. While shown and described herein as a single layer, the integrated conductive layer may be a plurality of layers, adjacent or interspersed, within the composite structural member. Additionally, the aspect ratio and cross sectional area of the integral conductive layer may vary over the length of the composite structural member.

Figure 12:
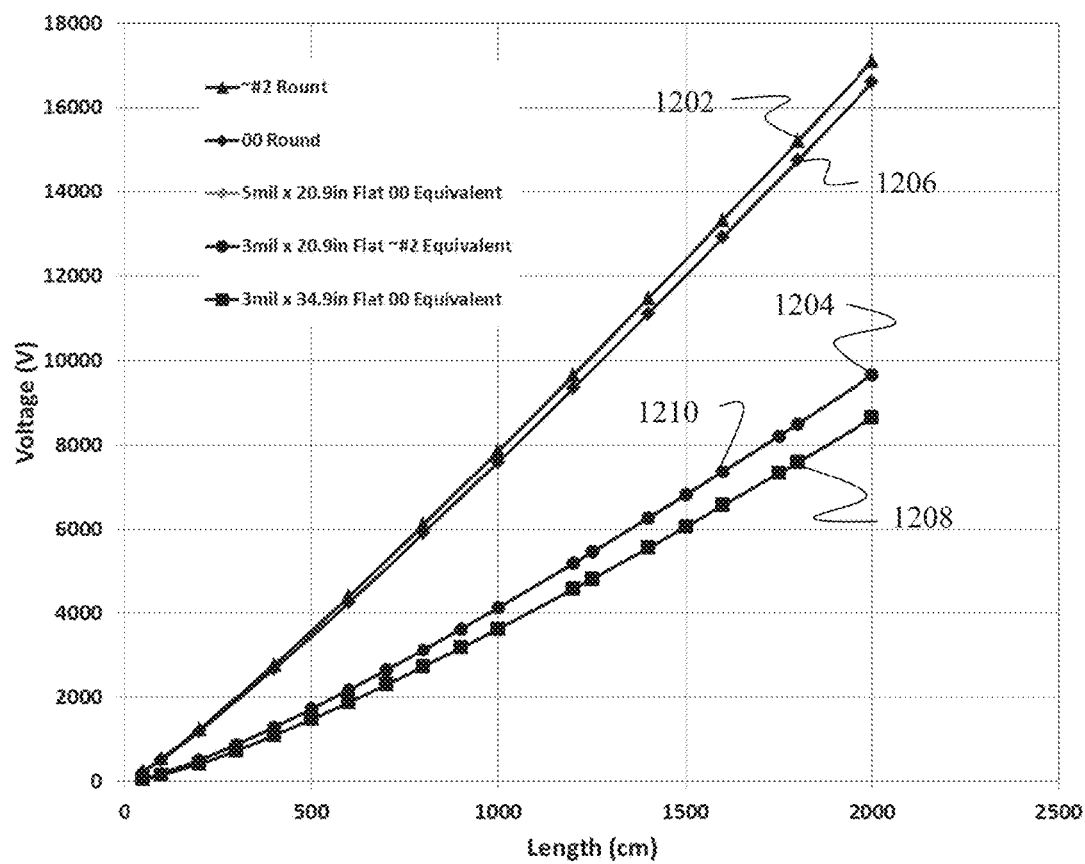
FIG. 12 is a graph demonstrating reduced self-induced voltage over length for a flat integrated conductive layer compared to a round prior art conductor.

The integrated conductive layers for a CRN additionally may be adapted provide a significant reduction in self-induced voltage by employing a high aspect ratio rectangular cross section as seen in FIG. 12. Trace 1202 shows the increase in self-induced voltage over length for a #2 round conductor (cross-sectional area 0.0521 in$^2$) with a self-induced voltage of 17000 V with application of 20 kA for 40 µsec at a length of 2000 cm. A conductive layer of 3 mil×20.9 in providing an equivalent area of 0.0521 in$^2$ as employed in the described embodiments shown in trace 1204 has a significantly reduced self-induced voltage at a length of 2000 cm of less than 10000 V. Similarly, trace 1206 shows the increase in self-induced voltage over length for a 00 round conductor (cross-sectional area 0.1045 in$^2$) with a self-induced voltage of about 16500V at a length of 2000 cm. A conductive layer of 3 mil×34.9 in providing an equivalent area of 0.1045 in$^2$ as employed in the described embodiments shown in trace 1208 also has a significantly reduced self-induced voltage at a length of 2000 cm of 8500 V. The alternative configuration for the equivalent to a 00 conductor of a conductive layer of 5 mil×20.9 to provide the equivalent area of 0.1045 in$^2$ shown in trace 1210 has a significantly reduced self-induced voltage at a length of 2000 cm comparable to the #2 replacement at less than 10000 V.

The electrical joints between structural elements and between structural elements and non-structural elements are critical in an integrated CRN architecture. Typically, a maximum resistance of 0.025 milli-Ohms is required and the joint must be designed to handle 250 Amps continuous or steady-state current Electrical interconnections between CFRP structural elements may be accomplished either through the use of interference fit sleeved fasteners or one or more fastened joint concepts such as disclosed in U.S. patent application Ser. No. 14/875,297 filed on Oct. 5, 2015 entitled METHODS FOR DIVERTING LIGHTNING CURRENT FROM SKIN FASTENERS IN COMPOSITE NON-METALLIC STRUCTURES. Electrical connections to metallic structures may be achieved by electrical fay surface bonds, interference fit fasteners, or rivet bonds.

Connections between structural CRN and non-structural elements such as jumpers and wire cables may be accomplished by fastening—through hole or blind, or soldering terminated ground studs/lugs to metal conductors in the structures, either metallic structures or CFRP structures with integrated metallic conductors with pad ups.

Figure 13:
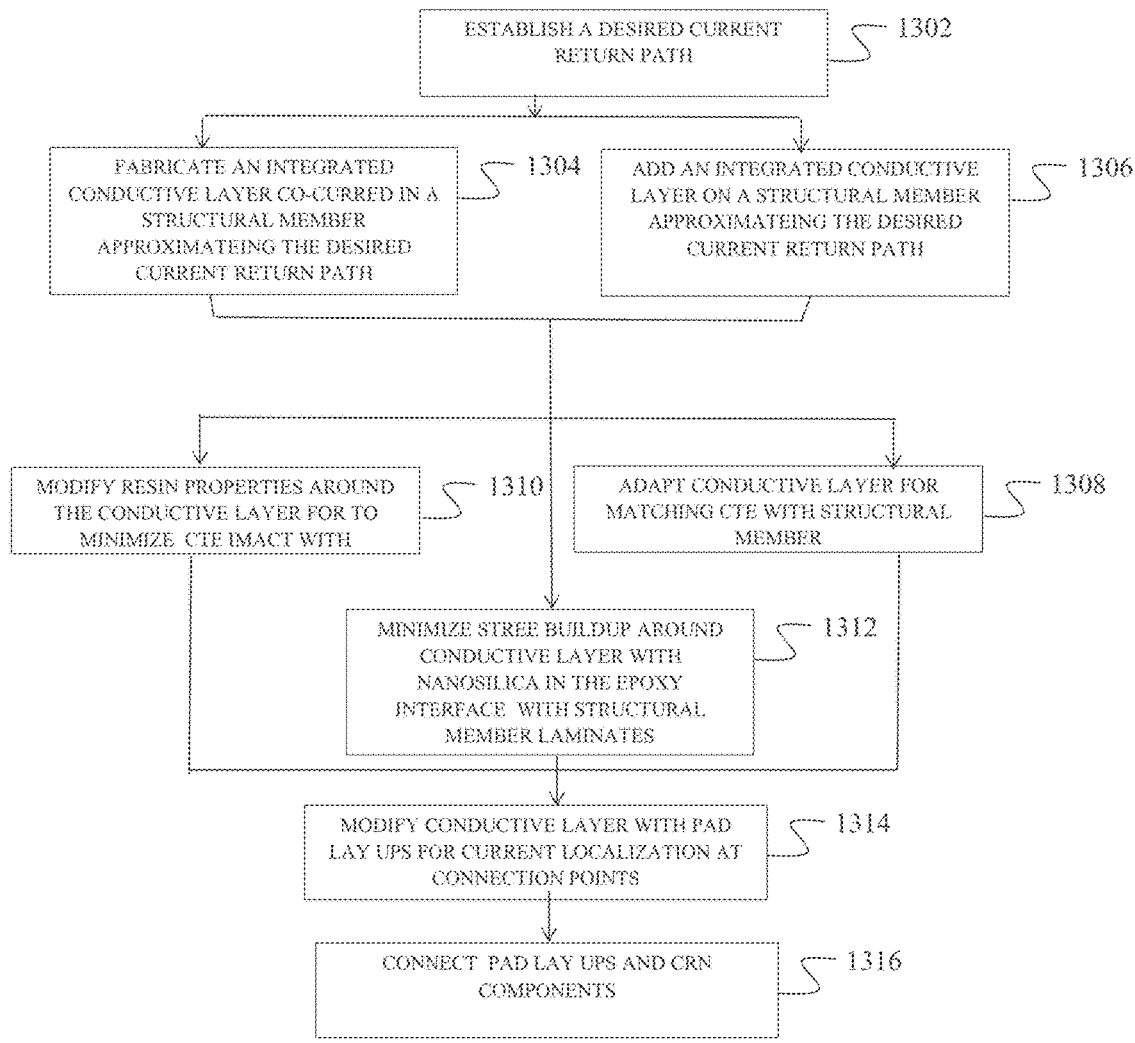
FIG. 13. Is a flow chart demonstrating a method for implementing the embodiments disclosed herein as a current return network; and, FIG. 14 is a flow chart demonstrating a method for current return in a commercial aircraft employing the embodiments disclosed herein.

As seen in FIG. 13, a method for implementing a CRN using integrated conductive layers as described for the embodiments herein is accomplished by establishing a desired current return path, step 1302. A structural member providing routing approximating the current return path is fabricated with at least one integrated conductive layer included in one or both of the web or caps, co-cured as a layer in the layup of the structural member step 1304, or added to the structural member as an applied surface layer, step 1306. The integrated conductive layer may be adapted for matching CTE within the CFRP laminate, step 1308, and/or resin properties of the CFRP modified to accommodate CTE mismatch, step 1310, or stress build up minimized by adding nano-silica to the epoxy interface between the integrated conductive layer and the CFRP laminates, step 1312. The integrated conductive layer is modified with pad ups for current localization at connection points, step 1314. Electrical connections between the integrated conductive layer and CRN components is accomplished with interference fit sleeved fasteners, electrical fay surface bonds, interference fit fasteners, or rivet bonds, step 1316.

Figure 14:
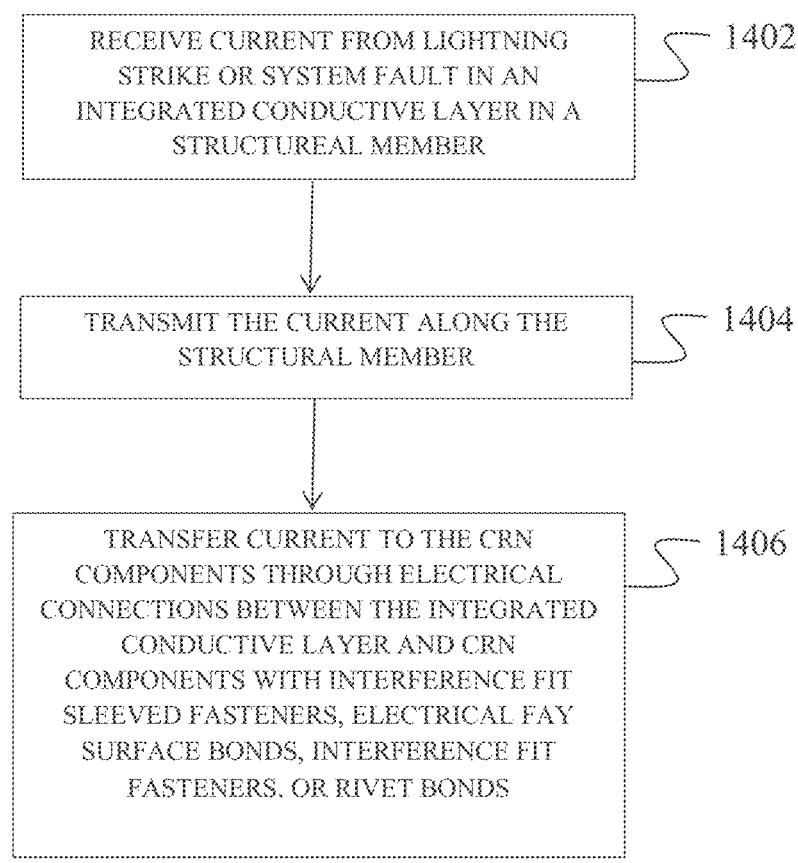

The embodiments disclosed herein provide for operation of a CRN for grounding aircraft systems as shown in FIG. 14 by receiving current from lightning strike or system faults in an integrated conductive layer in a structural member, step 1402, and transmitting the current along the structural member, step 1404. The current is transferred to CRN components, step 1406, through electrical connections between the integrated conductive layer and CRN components with interference fit sleeved fasteners, electrical fay surface bonds, interference fit fasteners, or rivet bonds.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A current return network (CRN) comprising:
   a composite structural element having a web;
   at least one flange connected to the web;
   at least one metallic conductive layer integrated with and extending the length of the web;
   wherein the at least one metallic layer is configured to electrically bond to an aircraft system and provide a ground path.

2. The CRN as defined in claim 1 wherein the at least one metallic conductive layer is co-cured in the composite structural element.

3. The CRN as defined in claim 2 wherein the at least one metallic conductive layer is an expanded metal foil.

4. The as defined in claim 3 wherein the expanded metal foil is configured to minimize induced stress from thermal expansion of the composite.

5. The aircraft component incorporated in a CRN as defined in claim 2 wherein the at least one metallic conductive layer comprises a conductor on flex.

6. The aircraft component incorporated in a CRN as defined in claim 1 wherein the at least one metallic conductive layer is applied to a surface of the composite structural element.

7. The aircraft component incorporated in a CRN as defined in claim 6 wherein the at least one metallic conductive layer comprises expanded metal foil or conductor on flex bonded to the composite structural element with high temperature adhesive to withstand heating caused by a short circuit or lightning.

8. The aircraft component incorporated in a CRN as defined in claim 6 wherein the at least one metallic conductive layer comprises a thermal spray layer, a direct write metal printed layer or a conductive ink printed layer.

9. A method for implementing a current return network (CRN) comprising:
establishing a desired current return path;
fabricating a structural member providing routing approximating the current return path with at least one integrated conductive layer;
modifying the integrated conductive layer with pad ups for current localization at connection points; and,
electrically connecting the integrated conductive layer and CRN components.

10. The method as defined in claim 9 wherein the step of electrically connecting is accomplished with interference fit sleeved fasteners, electrical fay surface bonds, interference fit fasteners, or rivet bonds.

11. The method as defined in claim 9 wherein the step of fabricating a structural member comprises co-curing the at least one integrated conductive layer as a layer in the layup of the structural member.

12. The method as defined in claim 9 wherein the step of fabricating a structural member comprises applying the at least one integrated conductive layer as a surface layer.

13. The method as defined in claim 12 wherein the step of applying the at least one integrated conductive layer comprises spraying a conductive thermal spray layer.

14. The method as defined in claim 12 wherein the step of applying the at least one integrated conductive layer comprises printing a direct write metal printed layer.

15. The method as defined in claim 12 wherein the step of applying the at least one integrated conductive layer comprises printing a conductive ink printed layer.

16. The method as defined in claim 10 further comprising adapting the integrated conductive layer for matching coefficient of thermal expansion within a carbon fiber reinforced plastic (CFRP) laminate.

17. The method as defined in claim 10 further comprising modifying resin properties of the CFRP laminate to accommodate coefficient of thermal expansion mismatch.

18. The method as defined in claim 10 further comprising minimizing stress build up by adding nano-silica to the epoxy interface between the integrated conductive layer and the CFRP laminate.

19. A method of grounding systems in an aircraft comprising:
receiving current from lightning strike or system faults in an integrated conductive layer in a structural member wherein the structural member comprises a composite structural element having a web with at least one flange connected to the web and the integrated conductive layer is a metallic conductive layer integrated with and extending the length of the web;
transmitting the current along the integrated conductive layer in the structural member; and,
transferring the current to current return network (CRN) components electrically bonded to the integrated conductive layer.

20. The method of claim 19 wherein electrical connections between the integrated conductive layer and CRN components comprise interference fit sleeved fasteners, electrical fay surface bonds, interference fit fasteners, or rivet bonds.

* * * * *